United States Patent

[11] 3,570,788

| [72] | Inventor | Joe Cox<br>Grantham, Lincs., England |
|---|---|---|
| [21] | Appl. No. | 795,627 |
| [22] | Filed | Jan. 31, 1969 |
| [45] | Patented | Mar. 16, 1971 |
| [73] | Assignee | Ferranti, Limited<br>Hollinwood, Lancashire, England |
| [32] | Priority | Feb. 6, 1968 |
| [33] | | Great Britain |
| [31] | | 5859/68 |

[54] FLIGHT AID SYSTEMS
2 Claims, 4 Drawing Figs.

[52] U.S. Cl........................................ 244/77,
73/504
[51] Int. Cl........................................ B64c 17/06
[50] Field of Search........................................ 244/77, 77
(E), 79, 3.2, 75, 76; 89/41.6, 41.7; 114/126, 122;
33/204.1, 204.15; 73/504

[56] References Cited
UNITED STATES PATENTS

| 3,322,939 | 5/1967 | Curties et al................ | 244/75(X) |
| 3,452,948 | 7/1969 | Kukel et al................ | 244/79(X) |
| 3,476,129 | 11/1969 | Halstenberg................ | 244/3.2(X) |

FOREIGN PATENTS

| 1,344,301 | 10/1963 | France........................ | 33/226 |

*Primary Examiner*—Milton Buchler
*Assistant Examiner*—James E. Pittenger
*Attorney*—Cameron, Kerkam and Sutton

ABSTRACT: A flight aid system is provided for an aircraft having a control system in which two parallel control rods move together in the same or in opposite directions to control movement of the aircraft about a first or a second control axis respectively. The system includes, for each control rod, a closed-loop autostabilizer including a rate gyroscope. The two rate gyroscopes are mounted with their sensitive axes coplanar with the two control axes and displaced by equal and opposite angles about the second control axis.

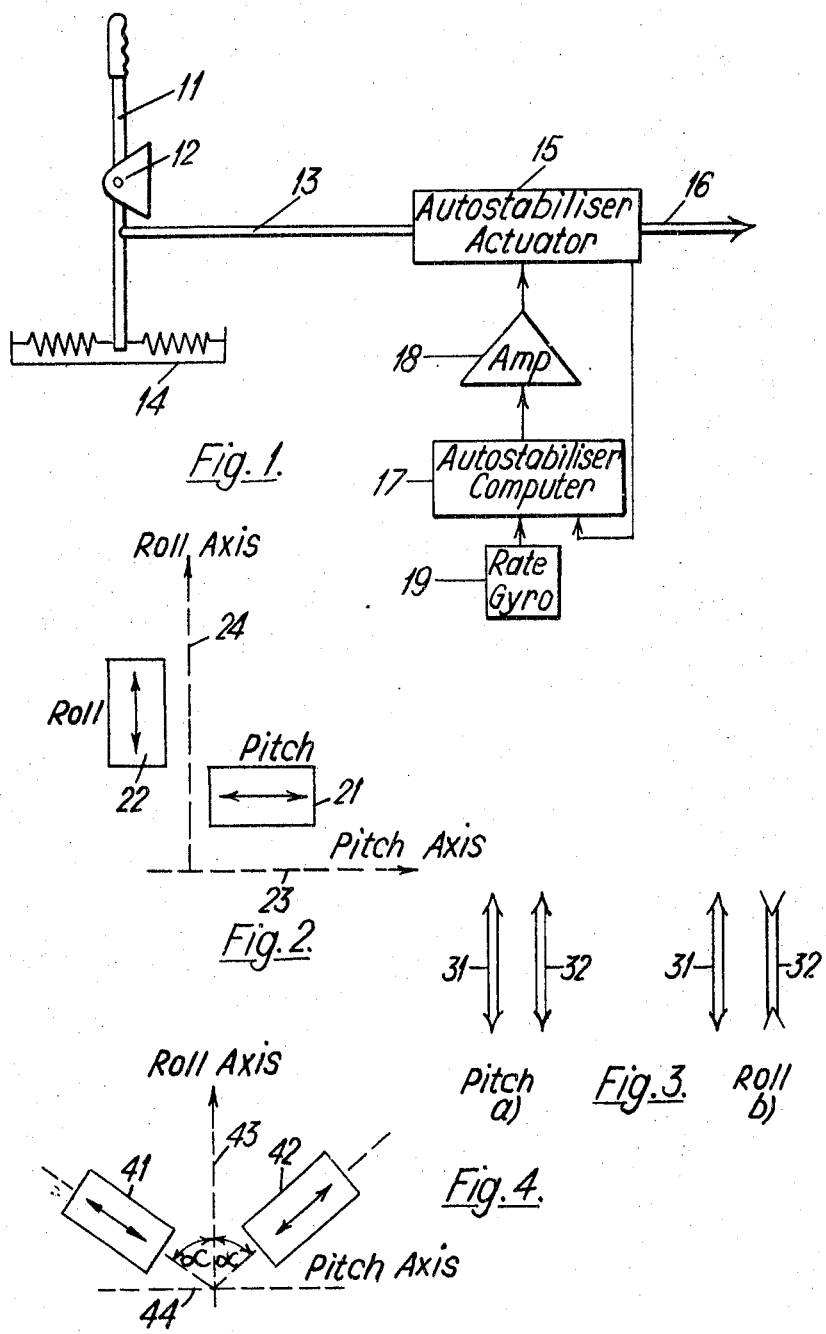

FLIGHT AID SYSTEMS

This invention relates to flight air systems.

More particularly the invention relates to flight air systems of the kind including a limited authority servosystem, usually known as an autostabilizer connected to in series with a control input and operating in response to signals from an autostabilizer computer to provide artificial stability to an aircraft. Such flight aid systems are particularly applicable to inherently unstable aircraft such as helicopters.

The usual helicopter control arrangement is such that up to some point between the pilot's control stick or pedals and the rotor, separate control rods represent pitch, roll and yaw functions, hereinafter referred to as "attitude functions." The control system also includes a "mixing box" into which these control rods run and after which any one attitude function is represented by the movement of two or more rods simultaneously. In such a case, the flight air system already mentioned may be used by incorporating a separate actuator into each required control rod at a point between the pilot's controls and the mixing box, where movement of one rod represents attitude function. Arrangements of this type are already known, and incorporate a separate rate gyro for each control axis, responsive to movements of the craft about one axis and operating the appropriate autostabilizer actuator through the associated autostabilizer computer. Hence to apply autostabilizer control to both the pitch and roll axes, for example, two rate gyros are necessary, measuring rates about perpendicular axes.

In some types of aircraft there is no definite "mixing box" and the control rods from their point of attachment to the pilot's controls do not represent a single attitude function only. In such a case the flight aid system referred to in the previous paragraph cannot be used.

The particular control system with which this invention is concerned is one in which two substantially parallel control rods together represent two attitude functions. One function, say pitch, is represented by movement of the two rods in the same direction and to the same extent to control movement of the craft about a first control axis, i.e., the pitch axis whilst the other function, say roll, is represented by movement of the two rods in opposite direction, again to the same extent, to control movement of the craft about a second, control axis, i.e., the roll axis. Hereafter such a control system is referred to as control system "of the kind specified."

An object of the invention is to provide a flight aid system operable to give artificial stability to an aircraft having a control system of the kind specified.

According to the present invention a flight air system for use with a control system of the kind specified includes, for each of the two control rods, a limited authority autostabilizer actuator, an autostabilizer computer operable to control the operation of the autostabilizer actuator, and a rate gyroscope operable to derive rate error signals for application to the autostabilizer computer, the two rate gyroscopes being mounted with their sensitive axes coplanar with said two control axes and displaced by equal and opposite angles about said second control axis, the angle of displacement being such that the desired ratio of control movements for the two controlled functions is produced.

The invention will now be described with reference to the accompanying drawings, in which:

FIG. 1 shows, in schematic form, one channel of a conventional autostabilizer;

FIG. 2 illustrates the positioning of the rate gyros in a conventional two-axis autostabilizer;

FIG. 3 illustrates the control arrangement in a control system of the kind specified; and FIG. 4 illustrates the positioning of the rate gyros in a two-axis autostabilizer according to the invention.

Referring now to FIG. 1, a pilot's control stick 11 is pivoted on the aircraft's structure 12 and is connected to a control rod 13. The bottom end of the control stick is connected to a spring feel unit 14. A limited authority autostabilizer actuator 15 is connected in series with the control rod 13 and actuates an output control rod 16 which is connected to a member to be controlled.

The autostabilizer actuator 15 is controlled by output signals from an autostabilizer computer 17, the signals being applied to the autostabilizer actuator through an amplifier 18. The input to the autostabilizer computer 17 is derived from a rate gyro 19, and negative feedback is applied in accordance with the output from the autostabilizer actuator 15.

In a conventional multiaxis control system in which one control rod represents one attitude function only, the arrangement of FIG. 1 is repeated for each of the controlled axes. If the control is applied to the pitch and roll axes then the pitch and roll rate gyros 21 and 22 respectively are mounted as shown in FIG. 2, with their sensitive axes perpendicular to one another. The arrows indicate the axis about which each gyro is sensitive. In this way the pitch gyro 21 responds only to movements of the aircraft about the pitch axis 23, whilst the roll gyro 22 responds only to movements about the roll axis 24. In either case the gyro output is applied via the appropriate autostabilizer computer 17 and amplifier 18 to the autostabilizer actuator 15.

FIG. 3 illustrates one control arrangement in a control system according to the invention. Two control rods 31 and 32 together convey both pitch and roll information from the pilot's stick. As shown in FIG. 3 a the two rods move in the same direction to convey pitch information, whilst as shown in FIG. 3 b the two rods move in opposite direction to convey roll information.

To provide an autostabilizer system which will operate with such a control system, an autostabilizer actuator is inserted into each control rod in the manner shown in FIG. 1. In order to obtain the appropriate directions of movement of the control rods, the two rate gyros 41 and 42 are mounted as shown in FIG. 4, with the sensitive axis of each displaced by an angle $\alpha$ from the roll axis 43 of the aircraft. As shown, the gyro axes are displaced on opposite sides of the roll axis. The pitch axis is represented at 44.

It will be seen that both gyros will respond to either pitch or roll movements of the aircraft. For example, if the aircraft moves only about the pitch axis 44, the output signals from the two gyros 41 and 42 will be of the same sense and of the same magnitude. These signals will be applied via their respective autostabilizer computers to the actuators, and will cause the two control rods to move in the same direction to the same extent. These are the movement necessary to control the pitch of the aircraft, as shown in FIG. 3 a. Similarly, if the aircraft moves only about the roll axis 43, the output signals from the two gyros will be of opposite sense, though of the same magnitude. The effect will be to move the control rods in opposite directions to the same extent, as is necessary to control roll (see FIG. 3 b). Any movement of the aircraft other than the two mentioned above will result in a combination of the two effects and control both pitch and roll simultaneously.

If the control rods were to be so arranged that pitch information involves moving the rods in opposite directions and roll information involves moving them in the same direction (i.e., the reverse of the conditions of FIG. 3), then the same flight air system could be used with the two gyros symmetrically displaced about the pitch axis 44.

The angle $\alpha$ is chosen such that the movements of the control rods for pitch and roll compensation are in the correct ratio to one another, and may vary from one type of aircraft to another.

Reference has been made to a control system having only two controlled axes. In practice the third axis will also be controlled by an autostabilizer, but in this case the rate gyro is mounted conventionally. The invention is not limited in application to helicopters, though it is in this type of aircraft that a control system of the kind referred to is most likely to be encountered.

I claim:

1. A flight air system for an aircraft having two attitude functions controlled by two substantially parallel control rods so arranged that simultaneous movement of the two rods in the same direction and to the same extent controls one attitude function and simultaneous movement of the two rods in opposite directions and to the same extent control the other attitude function, which system includes, for each of the two control rods, a limited authority autostabilizer actuator, an autostabilizer computer operable to control the operation of the autostabilizer actuator, and a rate gyroscope operable to derive rate error signals for application to the autostabilizer computer, the two rate gyroscopes being mounted with their sensitive axes coplanar with the axes of the two attitude functions and displaced by equal and opposite angles about one of said attitude function axes, the angle of displacement being such that the desired ratio of controlled movements for the two controlled attitude functions is obtained.

2. A flight air system as claimed in Claim 1 in which said one of said attitude function axes is the roll axis of the aircraft.

PO-1050
(5/69)

UNITED STATES PATENT OFFICE
CERTIFICATE OF CORRECTION

Patent No.     3,570,788          Dated    March 16, 1971

Inventor(s)   Joe Cox

It is certified that error appears in the above-identified patent and that said Letters Patent are hereby corrected as shown below:

Cover page, line 9 of the Abstract, "the second control axis" should read --one of said axes--. Column 1, line 1, "a should read --aid--; line 2, "air" should read --aid--; line insert a comma (,) after "autostabilizer" and delete "to"; line 17, "air" should read --aid--; line 20, insert --one-- after "represents"; line 42, delete the comma (,) after "se line 48 "air" should read --aid--. Column 2, line 9, "mult axis" should read --multi-axis--; line 25, insert --control after "pilot's" and insert a comma (,) after "Fig. 3a"; line 58, "air" should read --aid--; line 72, "air" should read --aid--. Column 3, line 4, "control" should read --control Column 4, line 7, "air" should read --aid--.

Signed and sealed this 10th day of August 1971.

(SEAL)
Attest:

EDWARD M. FLETCHER, JR.          WILLIAM E. SCHUYLER, JR.
Attesting Officer                Commissioner of Patents